Figures 1, 2, 3:
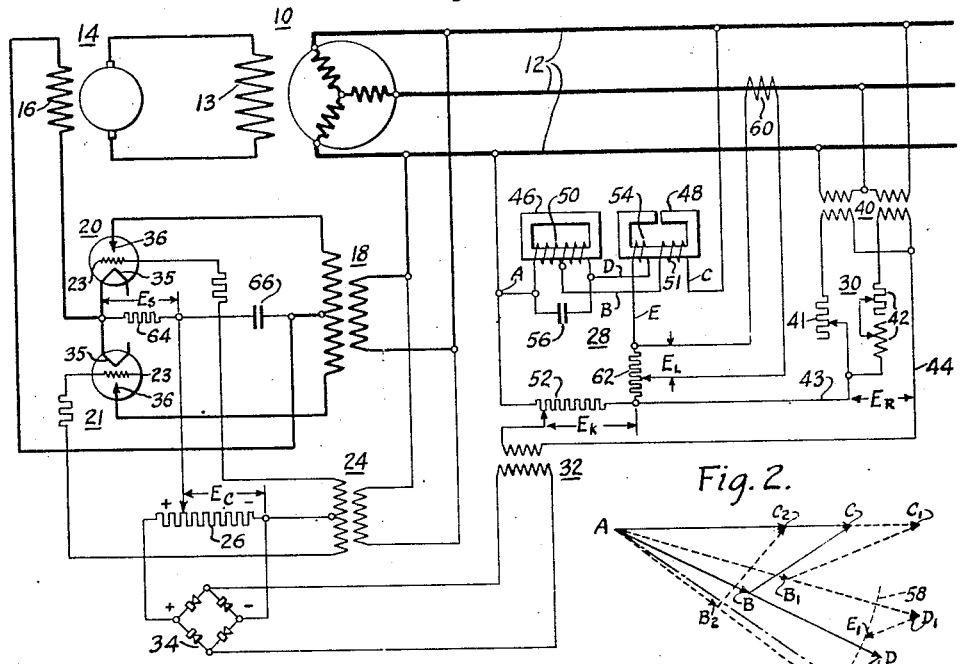

Oct. 13, 1936.   H. C. JENKS   2,057,490

REGULATING SYSTEM

Filed Dec. 18, 1934

Auxiliary A.C. Source

WITNESSES
Leon J. Faza.
C. F. Bryant.

INVENTOR
Harold C. Jenks.
BY
Ezra W. Savage
ATTORNEY

Patented Oct. 13, 1936

2,057,490

UNITED STATES PATENT OFFICE 2,057,490

REGULATING SYSTEM

Harold C. Jenks, Wilkinsburg, Pa., assignor to Westinghouse Electric & Manufacturing Company, East Pittsburgh, Pa., a corporation of Pennsylvania Application December 18, 1934, Serial No. 758,019

3 Claims. (Cl. 171—119)

My invention relates to electronic tube regulators and it has particular relation to improvements in voltage regulators for alternating current machines and circuits.

One object of my invention is to reduce the number of tubes required in regulators of the subject class.

Another object is to eliminate the necessity for the supplemental supply source of reference voltage which heretofore has been necessary to attain high sensitivity.

A further object is to provide a system in which the voltage of a polyphase circuit being regulated will be unaffected by phase unbalances.

A still further object is to provide improved load compensating means for such systems.

An additional object is to provide a regulating system possessed of the above particularized features in which all of the equipment utilized is of the static or non-moving part variety.

My invention itself, together with additional objects and advantages thereof, will best be understood from the following description of specific embodiments when taken in conjunction with the accompanying drawing, in which Figure 1 is a diagrammatic representation of apparatus and circuits comprised by one preferred form of the regulating system of my invention, Fig. 2 is a diagram of voltage vectors illustrating the manner of operation of the reference-voltage supply equipment comprised by the system of Fig. 1, and Fig. 3 is a diagrammatic representation of a second form of regulating system which embodies the principles of the present invention.

Referring to the drawing, the regulating system depicted in Fig. 1 is adapted to maintain constant the voltage of an alternating current generator 10, the armature windings of which are represented as being directly connected with the conductors 12 of a three-phase output circuit, and the field winding 13 of which is connected to derive energizing current from a direct current exciter 14. This exciter is provided with a field winding 16 which, in the system shown, derives its energization from the output circuit of the regulated machine through a transformer 18 and controllable electronic rectifier tubes 20 and 21.

The effective conductivity of these tubes is controlled through the medium of equipment especially arranged to effect the before-stated objects. In the arrangement shown, each of the grid elements 23 of the rectifier tubes has impressed thereon, through a transformer 24, a wave of alternating current voltage upon which is superimposed, from an adjustable portion of a resistor 26, a unidirectional control potential $E_c$ the magnitude of which is dependent upon the difference between a reference voltage $E_K$, supplied through equipment generally indicated at 28, and a regulated-quantity proportional potential $E_R$, supplied through equipment generally indicated at 30. The difference between voltages $E_K$ and $E_R$ is through a step-up transformer 32 impressed upon a full-wave rectifier 34, the output circuit of which serves to energize the resistor 26.

The polarity of the control voltage $E_c$ is such as to maintain the grid elements 23 of the rectifier tubes negative with respect to their cathode or filament elements 35, and depending upon the magnitude of this negative voltage, the point at which conduction starts during the positive half-cycle of the voltage impressed upon the tube anode elements 36 will be early or late. Thus, as voltage $E_c$ is increased this conduction starting point is progressively delayed, the effective conductivity of the tubes is proportionately decreased and the current supplied to field winding 16 of the machine exciter 14 is correspondingly lowered. In a similar manner, as voltage $E_c$ is lowered, the conduction starting point is advanced to progressively earlier points in the positive half-cycles of tube anode voltage and the machine excitation is correspondingly increased.

In the regulation of polyphase alternating current circuits, it is desirable that the voltage which influences the regulator should be representative of all the phases of the circuit rather than of any one particular phase only. In the system of my invention, accordingly, I connect between the regulating equipment and the regulated circuit 12, a positive phase sequence network equipment 30, which is the same as that shown and described in U. S. Patent No. 1,571,224, granted February 2, 1926 to C. T. Alcutt. This network, which functions to supply a single-phase voltage $E_R$ dependent upon all the phase voltages of circuit 12, is energized through voltage transformers 40 connected in open-delta to the conductors of the three-phase circuit 12. The secondary windings of these transformers are connected through properly proportioned impedance devices 41 and 42 to a conductor 43 between which the neutral conductor 44 of the secondary windings appears the voltage $E_R$ which is proportional only to the positive sequence voltage of circuit 12.

In order to produce high sensitivity, it is essential that this voltage $E_R$ be compared with a reference potential of constant magnitude, previously referred to as voltage $E_K$, which in all previous regulating systems of the subject character known to me has been supplied by an independent source having constant magnitude characteristics. In many systems previously utilized, this source has been in the form of a battery which being of definitely limited life has necessitated frequent, costly and inconvenient replacement. To eliminate these undesirable features, I supply, in the system of Fig. 1, this reference potential from the regulated circuit 12 and impart to it the required constant magnitude characteristic through the utilization of the previously referred to equipment shown at 28.

This equipment comprises a pair of core structures 46 and 48 which are designed to operate at different degrees of saturation, structure 46 being highly saturated and structure 48 being relatively unsaturated. The voltage A—C of one of the phases of circuit 12 is impressed upon a pair of series connected windings 50 and 51 respectively carried by the two named structures. In this core-exciting connection only the left-hand portion of the winding 50 is active. The constant magnitude voltage A—E which is impressed upon the resistor 52, across a portion of which the reference potential $E_K$ appears, is made up of the voltage appearing across the entire length of winding 50 and that of an opposition-connected winding 54. For the purpose of further shifting the phase of the currents supplied to the exciting windings of the two cores, the winding 50 of core 46 is paralleled by a capacitor 56.

The vector diagram of Fig. 2 illustrates the manner in which the equipment 28 operates. At an intermediate value of supply voltage A—C, the potential appearing across the left-hand portion of the saturated-core carried winding 50 is represented by vector A—B and that appearing across the winding 51 of the unsaturated core 48 by vector B—C. Vector B—D represents the potential induced in the right-hand portion of winding 50 while vector D—E shows the potential induced in winding 54. The output voltage A—E is the vector sum of voltages A—D and D—E and falls upon the arc of a circle 58. As the supply voltage is increased to A—$C_1$, for example, its division between the two core structure windings changes to that shown by vectors A—$B_1$ and $B_1$—$C_1$. The output voltage A—$E_1$ is then determined by the two vectors A—$D_1$ and $D_1$—$E_1$. While somewhat shifted in phase position, the magnitude remains unchanged, the end of vector $D_1$—$E_1$ falling upon the circle arc 58.

In a similar manner, when the supply voltage decreases to A—$C_2$, the output voltage impressed upon the resistor 52 is given by the vector A—$E_2$ which is still the same magnitude though shifted in phase position in the opposite direction. This constant magnitude relation is, of course, available only when the electrical constants of all of the different elements comprised by the equipment 28 are properly correlated, which correlation in practice is readily attained. The equipment furthermore is relatively low in cost, exceedingly reliable in operation and affords a practically instantaneous response to changes in the energizing voltage. When connected in the manner shown in Fig. 1, it assures a constant magnitude reference voltage $E_K$ throughout a wide range of fluctuation in the voltage of supply circuit 12.

In operation of the complete regulating system of Fig. 1, when the voltage of circuit 12 is of the normal or desired value, the proportional single-phase potential $E_R$ somewhat exceeds the reference potential $E_K$ with which it is connected in phase opposition. For this condition there is impressed upon the primary winding of transformer 32 a small value of alternating current voltage which, after being amplified by the transformer, is rectified by equipment 34 and impressed upon resistor 26. The resulting intermediate value of control voltage $E_C$ renders the rectifier tubes 20 and 21 of that intermediate degree of effective conductivity required to supply to the regulated machine the appropriate value of excitation.

Upon a rise in the regulated voltage, potential $E_R$ exceeds opposing reference voltage $E_K$ by a greater margin and in this manner increases the magnitude of control voltage $E_C$. As a result, the conductivity of the excitation supply tubes 20 and 21 is decreased and the machine excitation sufficiently lowered to lower the voltage of circuit 12 back to the desired value. In a similar manner when the regulated voltage drops below the desired value, the corresponding decrease in potential $E_R$ effects a lowering in control voltage $E_C$ which acts to raise the tube conductivity and restore the voltage of machine 10 back to the desired value.

In many situations, it is desirable to cause a regulator to increase the value of voltage which it maintains as the load supplied by the regulated machine is increased. In the system of Fig. 1, I effect such compensation through the utilization of a current transformer 60 in one of the conductors of the output circuit 12, which transformer circulates through a resistor 62 a load-proportional current which causes to appear across this resistor a compensating potential $E_L$. By properly interposing this potential between the equipment 28 and the resistor 52 to which it is connected, the value of reference voltage $E_K$ may be caused to increase as the load on the regulated machine 10 rises. The direct result of course is that the regulating equipment will function to correspondingly raise the machine voltage as the loading of the machine is increased. Should it be desired to compensate the regulator in the opposite direction, that is to lower the voltage maintained as the machine loading rises, this may be effected by reversing the connections of transformer 60 to resistor 62 in the supply circuit of reference potential resistor 52.

In order to prevent overshooting of the corrective actions, the regulating system of my invention may be stabilized through the use of any one of a number of anti-hunting systems now known in the art. One form of stabilizing apparatus which I find particularly satisfactory comprises a resistor 64 connected in series with a capacitor 66 for energization by the voltage which is supplied to the excitation-adjusting winding 16. The resistor 64 is further connected in the grid control circuit of the rectifier tubes 20 and 21 in such manner as to cause the voltage drop $E_S$ across the resistor, which drop varies with the direction and rate of change of the machine excitation, to supplement or modify the control potential Ec. The polarity relations are such that in direction this modification opposes the change in Ec which produced the excitation adjustment. In this manner, corrective actions instituted by the regulator are so prematurely interrupted that all tendency thereof to overshoot is effectively eliminated.

In certain situations, it is found preferable to combine the reference and error-responsive potentials in a direct current circuit rather than in an alternating current circuit as is shown in Fig. 1. In Fig. 3, I have represented circuits appropriate for effecting this second type of combination. The regulating system shown in Fig. 3 is basically the same as that of Fig. 1 with the exception that the rectifier tubes 20 and 21 supply their adjustable output current directly to the field winding 13 of the regulated machine 10, and the source of power for this exciting current is in the form of an auxiliary alternating current circuit 70. An additional difference is in the fact that the equipment 28 through which the reference potential is supplied is also energized from the auxiliary supply source 70.

To the output circuit of the positive phase sequence network 30 is connected a full-wave rectifier 72, which impresses upon a resistor 73 an error responsive potential E'ᴿ. In a similar manner, the output circuit of reference supply voltage equipment 28 is connected to a full-wave rectifier 74 which impresses upon the resistor 75 the unidirectional reference potential E'ᴋ. Likewise, the compensating transformer 60 has interposed between it and the resistor 62' a rectifier 77 in order that the compensating potential E'ʟ may also be unidirectional. These unidirectional voltages are all combined in a suitable circuit 80 and impressed upon the control potential resistor 26, the polarities being as indicated.

At normal value of the regulated voltage potential E'ᴿ exceeds the reference potential E'ᴋ with which it is connected in opposition. Consequently, in operation of the regulating system of Fig. 3, as the voltage regulated circuit 12 rises above the desired value, the control voltage Ec is increased to decrease the effective conductivity of rectifier tubes 20 and 21 and appropriately lower the excitation of machine 10. In a similar manner, as the regulated voltage drops below the desired value, the unidirectional potential supplied to resistor 26 is correspondingly lowered to raise the effective conductivity of tubes 20 and 21 and correctively increase the machine excitation.

In operation, the compensating system is exactly comparable to that explained in the system of Fig. 1, it acting upon rise in machine load to increase the reference voltage E'ᴋ with which the error responsive potential E"ᴿ is connected in opposition. The anti-hunting means comprising resistor 64 and capacitor 66 also function in a manner exactly comparable to that explained in connection with Fig. 1.

Although I have shown and described certain specific embodiments of my invention, I am fully aware that many modifications thereof are possible. My invention, therefore, is not to be restricted, except insofar as is necessitated by the prior art and by the scope of the appended claims.

I claim as my invention:

1. A voltage regulating system for a polyphase alternating-current circuit comprising, in combination, an electronic tube for adjusting the voltage of this circuit, means for impressing a control potential upon said tube, means for producing an alternating-current reference potential of unvarying magnitude, means for producing a single-phase potential which is representative of the voltage of all of the phases of said circuit, and a circuit for causing changes in the difference between said reference and representative potentials to vary the character of said tube control potential.

2. A voltage regulating system for a polyphase alternating-current circuit comprising, in combination, an electronic tube for adjusting the voltage of this circuit, means for impressing a control potential upon said tube, means for producing an alternating-current reference potential of unvarying magnitude, a network connection with the regulated circuit for producing a single-phase potential which is representative of the positive-phase sequence component of the circuit voltage, and a circuit for causing changes in the difference between said reference and representative potentials to vary the character of said tube control potential.

3. In a system comprising an alternating-current source of power, a load circuit supplied thereby, and a voltage regulator comprising an electronic tube for adjusting the voltage of said source, means for producing an alternating-current reference potential of unvarying magnitude, and means for impressing upon said tube a control potential determined by the difference between said reference potential and the voltage of said source of power, the combination of a load-compensator for said regulator which comprises means for supplementing said reference potential by a modifying voltage which varies with the load current supplied to said circuit.

HAROLD C. JENKS.